Patented Aug. 24, 1954

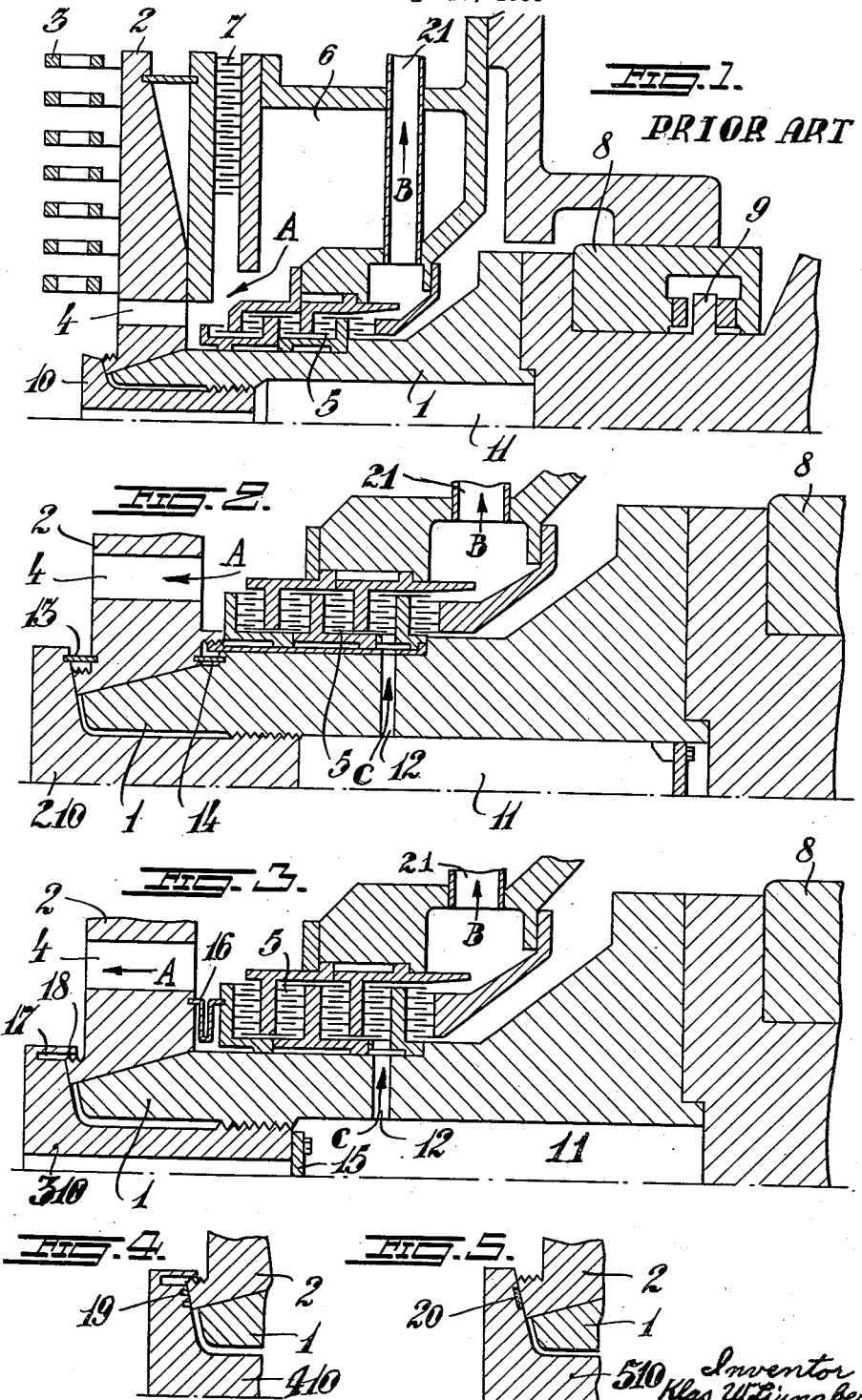

2,687,279

UNITED STATES PATENT OFFICE 2,687,279

ELASTIC FLUID TURBINE OR COMPRESSOR

Klas Wilhelm Ljungberg, Finspong, Sweden, assignor to Svenska Turbinfabriks Aktiebolaget Ljungstrom, Finspong, Sweden, a Swedish joint-stock company Application August 17, 1950, Serial No. 180,033

1 Claim. (Cl. 253—79)

This invention relates to turbines or compressors having one or more blade carrying disks supported by an overhanging shaft and secured thereto by a locking device situated in an axial bore in the shaft which is provided with a head engaging the disk.

The invention is characterized, chiefly, by the feature that the bore is sealed from surrounding spaces containing operative fluid of a comparatively high pressure and communicates with a space of a comparatively low pressure with a view to reducing the strains and stresses in the locking device.

In the accompanying drawing, Fig. 1 is a fractional longitudinal section of a radial flow turbine of well-known construction, whereas Figs. 2-5 show various embodiments of the invention as applied to a turbine of the said kind.

With reference to Fig. 1 of the drawing, the numeral 1 indicates an overhanging shaft supporting a turbine disk 2 having a set of blade rings 3. Driving fluid is supplied to the set of blade rings 3 through apertures 4 formed in the disk 2. The shaft 1 is surrounded by a labyrinth packing 5. 6 is a driving fluid supplying chamber the direction of flow of the fluid being indicated by arrow A. Numeral 7 designates a labyrinth packing, 8 is a shaft bearing, and 9 is an associated thrust bearing. The turbine disk 2 is locked against axial movement on the shaft 1 by means of a locking screw 10 situated in an axial bore 11 of shaft 1 and in threaded engagement therewith. Numeral 21 indicates a discharge pipe for the escape to atmosphere of any driving fluid which may pass packing 5, thus maintaining a zone of low presssure surrounding the shaft compared with the pressure of the driving fluid, the discharge flow being indicated by arrow B.

In operation, the driving fluid produces an outwardly (that is, to the right in the drawing) acting thrust on the shaft which is approximately equal to the product of the pressure and the cross sectional area of the shaft and one half of the shaft packing. At such high pressures as are commonly used in modern turbines said axial thrust will become too high for the thrust bearings hitherto used. It is, therefore, necessary either to construct thrust bearings of increased dimensions with resulting increased losses, or to decrease the said outwardly directed axial thrust. Such a decrease may be attained by dimensioning the labyrinth packing 7 so small, that is, small radial extent, or area that the disk 2 will be subjected to a high inwardly directed axial thrust. In such case, however, it may happen that the disk 2 would be displaced on the tapered end of the shaft 1 so that it would press against the locking screw 10. If this screw should be subjected to undue tensile stresses at the high temperatures used, then the material of the screw might start creeping, which might result in the disk being entirely loosened from the shaft.

The invention has for its object to suppress such dangerous tensile stresses in the locking screw 10 by the provision of means whereby the head of said screw is forced against the turbine disk 2.

In the embodiment of the invention shown in Fig. 2 the bore 11 communicates through passages 12 with a point or space of the shaft packing 5 where during operation a zone of comparatively low pressure prevails surrounding shaft 5. Besides, the bore 11 is sealed from surrounding spaces in which a comparatively high pressure exists, by means of packing rings 13, 14 located between the disk 2, on the one hand, and the head of the screw 210 and the shaft 1, respectively, on the other hand, and further by making the screw 210 solid, that is to say, without the bore shown in Fig. 1. The sealing rings 13 and 14 retard fluid of a higher pressure from leaking into the bore 11 and due to the passage 12 connecting bore 11 with the zone of low pressure surrounding shaft 1 in packing 5, any fluid which leaks past these sealing rings will flow out through passage 12 as indicated by arrow C, and eventually be discharged through pipe 21. Thus a difference is obtained between the pressures existing on opposite sides of the screw 210 with a resulting forcing of the screw 210 against the turbine disk 2 so that the pressure resulting from the labyrinth packing 7 may be counterbalanced without giving rise to undue forces.

In Fig. 3 is shown a locking screw 310 having a bore closed at its inner end by a cover 15. Between the disc 2 and the shaft packing 5 there is a sealing ring 16. The sealing effect between the disc 2 and the head of the locking screw 310 is secured by an annular flange 17 provided on the head of the screw 310 which engages dismantling threads 18 provided on a shoulder of the disk 2. It is true that a certain leakage may take place along the threads, such leakage, however, is of a neglectable degree.

In Fig. 4 a similar sealing as that of Fig. 3 is provided between the head of the screw 410 and the disk 2. In addition, annular sealing members are located in recesses 19 formed in the head of the locking screw 410. Fig. 5 shows another type of annular packing 20.

According to Fig. 2 the shaft packing 5 is mounted on a sleeve slidable axially along the shaft 1 and in threaded engagement with the disk 2. As a result, the thrust appearing in the shaft packing 5 will be transmitted to the disk 2, thereby reducing the inwardly directed pressure thereon.

What I claim is:

In an elastic fluid machine of the class specified, the combination of an over hanging shaft having a central bore opening into the free end thereof, means providing a zone of relatively low pressure, compared with the pressure of the driving fluid of the machine, surrounding a portion of said shaft, a blade disc supported on the shaft at the free end thereof, a locking member inserted in said bore of the shaft and secured thereto and having an outwardly flaring head having an inner surface bearing against said blade disc for locking the disc against slipping off the shaft end, a first sealing means located between the surface of the blade disc facing said head and the peripheral portion of the head of the locking member for sealing the joint between said head of the locking member and the blade disc, other sealing means between said blade disc and said shaft for sealing the bore of the shaft against communication with surrounding spaces containing a high pressure driving fluid, said shaft being provided with a passage leading from an inner point of said bore to said surrounding zone of relatively low pressure, whereby the surface of the locking member head facing the blade disc and located radially inwardly of said first sealing means is subjected to a lower pressure than the opposite surface thereof, and the pressure difference thus obtained serves to relieve stresses of the locking member.

References Cited in the file of this patent

UNITED STATES PATENTS

| Number | Name | Date |
|---|---|---|
| 1,337,096 | Rice | Apr. 13, 1920 |
| 1,347,343 | Ljungstrom | July 20, 1920 |
| 1,378,506 | Wiberg | May 17, 1921 |
| 2,023,482 | Lysholm | Dec. 10, 1935 |